(12) United States Patent
Wu et al.

(10) Patent No.: US 11,759,931 B2
(45) Date of Patent: Sep. 19, 2023

(54) NAIL DRIVE DEVICE OF ELECTRIC NAIL GUN

(71) Applicant: DE POAN PNEUMATIC CORP., New Taipei (TW)

(72) Inventors: I-Tsung Wu, New Taipei (TW); Chia-Sheng Liang, New Taipei (TW); Zhen-Liang Liao, New Taipei (TW); Wen-Chin Chen, New Taipei (TW)

(73) Assignee: DE POAN PNEUMATIC CORP., New Taipei (TW)

( * ) Notice: Subject to any disclaimer, the term of this patent is extended or adjusted under 35 U.S.C. 154(b) by 0 days.

(21) Appl. No.: 17/848,023

(22) Filed: Jun. 23, 2022

(65) Prior Publication Data
US 2023/0055687 A1 Feb. 23, 2023

(30) Foreign Application Priority Data

Aug. 17, 2021 (TW) .................... 110130294

(51) Int. Cl.
| | |
|---|---|
| *B25C 1/06* | (2006.01) |
| *H02K 7/14* | (2006.01) |
| *H02K 1/06* | (2006.01) |
| *H02K 7/12* | (2006.01) |

(52) U.S. Cl.
CPC ................. *B25C 1/06* (2013.01); *H02K 1/06* (2013.01); *H02K 7/12* (2013.01); *H02K 7/145* (2013.01); *H02K 2213/03* (2013.01)

(58) Field of Classification Search
CPC ........ B25C 1/06; H02K 1/16; H02K 2213/03; H02K 7/06; H02K 7/12; H02K 7/145
See application file for complete search history.

(56) References Cited

U.S. PATENT DOCUMENTS

| | | | |
|---|---|---|---|
| 5,511,715 A | * 4/1996 | Crutcher | B25C 1/06 227/8 |
| 2007/0095876 A1 | * 5/2007 | Oda | B25C 1/06 227/131 |
| 2009/0045241 A1 | * 2/2009 | Fukinuki | B25C 1/06 227/131 |
| 2019/0366524 A1 | * 12/2019 | Schmidt | B25C 1/06 |
| 2021/0008701 A1 | * 1/2021 | Tan | B25C 1/008 |

* cited by examiner

*Primary Examiner* — Naishadh N Desai
(74) *Attorney, Agent, or Firm* — Chun-Ming Shih; HDLS IPR SERVICES

(57) ABSTRACT

A nail drive device of electric nail gun includes a nailing rod and a rotary actuator that can output a specific rotation angle and can drive the nailing rod to move downward for nailing. Specifically, the rotary actuator includes a stator and a rotor surrounding it, between the stator and the rotor, even groups of electro-magnetic mutual action components are configured in pairs, to generate a tangential force to drive the rotor to rotate for a specific rotation angle, and to drive the nailing rod to move for a nailing stroke. The nailing stroke can be determined by the specific rotation angle. Thus, through the above configuration of the rotary actuator, the structure of the electric nail gun can be simplified.

14 Claims, 7 Drawing Sheets

NAIL DRIVE DEVICE OF ELECTRIC NAIL GUN

BACKGROUND OF INVENTION

1. Field of the Invention

The present invention relates generally to an electric nail gun, and more particularly to a nail drive device that converts electrical power to mechanical power by using a rotary actuator.

2. Description of Related Art

A conventional electric nail gun usually includes a motor and an elastic device to drive the nailing rod to move downward for nailing and upward for resetting. Generally, the way in which the nailing rod is driven by the motor and elastic device can fall into two types:

One is using the motor to drive the rotation of a flywheel. The spinning flywheel can accumulate an angular kinetic energy. By configuring the sliding base of a nailing rod to be in contact with the flywheel, the angular kinetic energy accumulated by the flywheel will be suddenly transferred to the sliding base upon contact, and drive the nailing rod on the sliding base to output a massive linear kinetic energy, pushing the nailing rod to move downward for nailing. When the nailing rod moves downward for nailing, it will cause the elastic device to accumulate an elastic potential energy. Then, the elastic potential energy of the elastic device will drive the nailing rod to move upward for resetting.

The other is using a motor to drive the nailing rod that has moved downward for nailing to move upward for resetting, and during the resetting process, the elastic device is driven to accumulate an elastic potential energy, so that the elastic potential energy can be released at a controlled time to drive the nailing rod to move downward and be converted to a kinetic energy for nailing.

However, both of the above ways in which the nailing rod is driven by the electrical power have the problem that the motor cannot directly control the reciprocating movement of the nailing rod based on the nailing stroke, and the rotational power output from the motor must be converted by an energy converting mechanism to drive the nailing. This leads to complicated structure of the electric nail gun. Therefore, an improvement is required.

SUMMARY OF THE INVENTION

The object of the present invention is to provide an effective solution to the problem of the conventional electric nail gun in which the motor cannot directly control the reciprocating movement of the nailing rod based on the nailing stroke, so as to simplify the structural complexity of the electric nail gun.

In view of this, the present invention provides a nail drive device that can be configured inside the body of the electric nail gun, which specifically comprises a nailing rod and a rotary actuator that can output a specific rotation angle. The nailing rod is slidably configured inside the body along a nailing line, and one end of the nailing rod is formed with a driving portion. The rotary actuator includes a rotor concentrically configured around a stator. Between the stator and the rotor, even groups of electro-magnetic mutual action components are configured in pairs. Each group of the electro-magnetic mutual action components includes a wire cluster that can generate an effective magnetic field by the same specific electrical current direction, and a magnetic plate that provides an effective magnetic field to generate magnetic lines to induce mutual action with the wire cluster.

The essential features of the present invention to solve the above problem include that, in the aforesaid configuration, the stator is fixed inside the rotational actuator, the rotor is formed with a power output end, the power output end is connected to the driving portion of the nailing rod; the directions of the electrical current generated by the two neighboring wire clusters are opposite, and the configuration of the two neighboring magnetic plates can generate magnetic lines of opposite polarities, so that the two neighboring electro-magnetic mutual action components can work together to generate a tangential force in the same rotational direction, to drive the rotor to rotate for a specific rotation angle, and then, through the power output end and the driving portion, to drive the nailing rod to move downward along the nailing line for a nailing stroke; and the wire cluster in each group of the electro-magnetic mutual action components has a slot opening width for generating an effective magnetic field, and the magnetic plate in each group of the electro-magnetic mutual action components has a magnetic plate arc length for dissipating magnetic lines. The specific rotation angle is defined by the slot opening width and the magnetic plate arc length. The nailing stroke includes is determined by the specific rotation angle.

Based on the above, the present invention can use the rotary actuator to replace the motor configured in the conventional nailing machine, and plan a specific rotation angle to be output by the rotary actuator based on the nailing stroke, so as to directly drive the nailing rod to move for the specific nailing stroke. Through such an implementation, the present invention can use ordinary means of input current and voltage control to directly control the specific rotation angle to be output by the rotary actuator as the power source for nailing. Therefore, it can simplify the structural complexity of the electric nail gun by removing the installation of unnecessary components.

In addition, in other implementation details, the power output end can be a swing arm or a gear sector. When the power output end is a swing arm, the two ends of the swing arm is respectively formed with a ring part and a pivoting part, the swing arm is fixed through the ring part on outer wall of the rotor, the swing arm is connected through the pivoting part to the driving portion of the nailing rod. When the power output end is a gear sector, the driving portion of the nailing rod is formed into a gear rack, the two ends of the gear sector is respectively formed with a ring part and a gear sector part, the gear sector is fixed through the ring part on the outer wall of the rotor, and the gear sector mesh with the gear rack through the gear sector part.

In other implementation details, the even number of wire clusters are configured on the outer wall of the stator along a normal line of the stator at intervals, the direction of the electrical current is perpendicular to the normal line. Furthermore, the periphery of the stator is configured with even numbers of spaced wire collecting slot for mounting wire clusters, and two neighboring wire collecting slots provide at least one wound coil to form the wire clusters in the respective wire collecting slots. Each of the wire collecting slots has an open slot opening formed in the direction of the normal line of the stator. The slot opening width is defined by the open slot opening. The even number of magnetic plates are fixed on the inner wall of the rotor in a way to induce mutual action with the electrical current generated by the wire clusters in the direction of the normal line. Specifically, the magnetic plate arc length can be larger than or less than the specific rotation angle arc length in the direction of the normal line of the stator.

In other implementation details, particularly in the reset movement after the nailing rod has moved for a nailing stroke, the resetting force upon the nailing rod can be provided by an elastic device or directly by the rotary actuator.

In the implementation that uses an elastic device to provide the resetting force, the elastic device can be connected between the body and the power output end, or, the elastic device can be connected between the body and the nailing rod, for the elastic device to generate an elastic force when the nailing rod has moved for a nailing stroke, and the elastic force is used to drive the nailing rod to move along the nailing line for resetting.

In a preferred embodiment that uses the rotary actuator to provide the resetting force, the two ends of the wire are connected to a forward current and a backward current in different times. The forward current is used to drive the nailing rod for nailing, whereas the backward current is used to drive the nailing rod for resetting.

In another preferred embodiment that uses the rotary actuator to provide the resetting force, each of the wire clusters includes a nailing wire cluster and a resetting wire cluster. The coils include at least one nailing coil and at least one resetting coil, and two neighboring wire collecting slots provide room for winding both the nailing coil and the resetting coil, to form the nailing wire cluster and resetting wire cluster in each of the wire collecting slots. The nailing coil is formed by winding a nailing wire in serial connection, whereas the resetting coil is formed by winding a resetting wire in serial connection. The two ends of the nailing wire can be connected to a forward current to drive the nailing rod for nailing, whereas the two ends of the resetting wire can be connected to a backward current to drive the nailing rod for resetting.

In other implementation details, a rotor stopper can be fixed inside the body to limit the swing angle.

Based on the above, apart from using the rotary actuator to provide the specific rotation angle required by the nailing stroke, the technical effects of the present invention also include providing multiple functional implementation means, for example: (1) the rotary actuator is solely used to drive the nailing rod to move downward for nailing, and an elastic device is combined to drive the nailing rod to move upward for resetting. (2) the rotary actuator is used to drive the nailing rod to move downward for nailing and to move upward for resetting. (3) based on the concentric positions of the stator and rotor of the rotary actuator, an even number of groups of electro-magnetic mutual action components can be planned, and the slot opening width generated by the wire cluster in each pair of electro-magnetic mutual action components and magnetic plate arc length can be used to define the specific rotation angle required by the nailing stroke, so that the rotary actuator provided by the present invention can be perfectly applied in the electric nail gun to replace the unnecessary motor components to simplify the complicated structure of the conventional electric nail gun, and to enhance the accuracy of motion positions of the nailing rod moving downward for nailing and moving upward for resetting.

Further benefits and advantages of the present invention will become apparent after a careful reading of the detailed description with appropriate reference to the accompanying drawings.

DETAILED DESCRIPTION OF THE INVENTION

Figure 1:
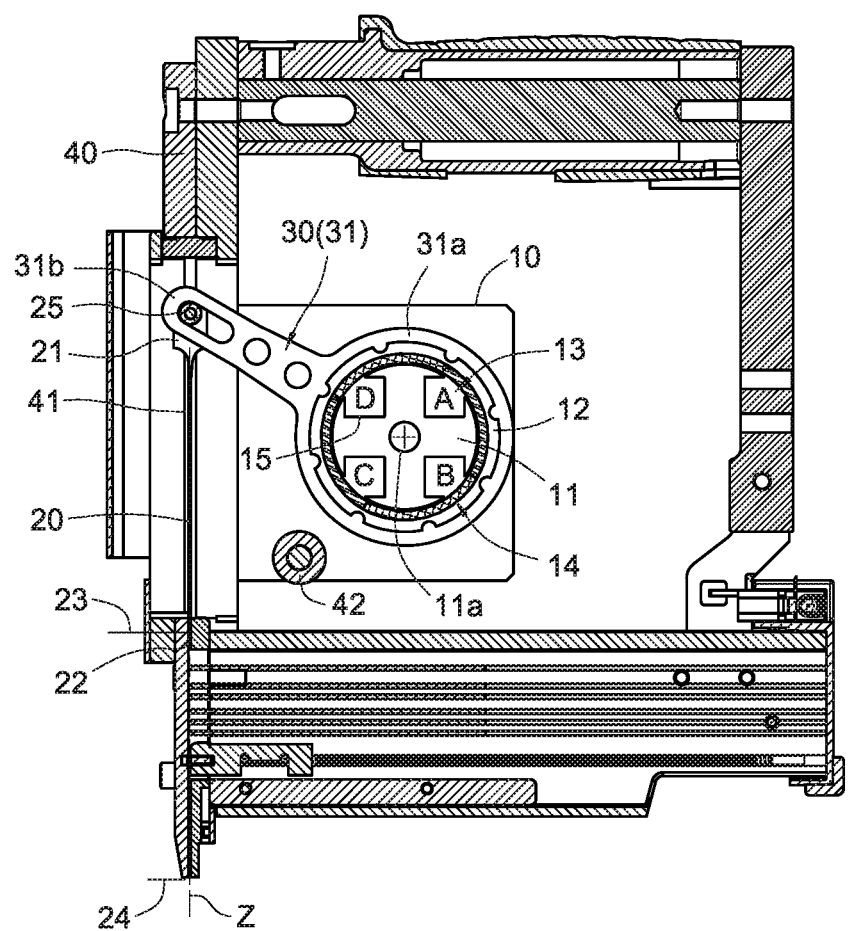
FIG. 1 is a sectional view of one embodiment of the nail drive device according to the invention.

FIG. 1 depicts the configuration details of a preferred embodiment of the present invention. As illustrated, the nail drive device of the electric nail gun according to the present invention is included inside the body 40 of the electric nail gun and is slidably configured with a nailing rod 20, and a rotary actuator 10 is fixed with the body 40 as the fixing end. Specifically:

One side of the body 40 is configured with a guide slot 41, arranged along a nailing line and extending toward Z, so that the nailing rod 20 can be slidably fitted inside the guide slot 41 of the body 40, so as to move along the nailing line downward to Z for nailing and to move upward for resetting. In FIG. 1 of the present invention, the moving direction of the nailing line toward Z is the vertical direction. The top end of the nailing rod 20 is formed with a driving portion 21 connected to the rotary actuator 10 for power output, and the bottom end of the nailing rod 20 is an impact portion 22 to shoot nails. Based on the above structure, in the present invention, through the specific rotation angle (to be described in detail later) output by the rotary actuator 10, the nailing rod 20 can be driven to move along the nailing line toward Z in a reciprocating manner, so that the impact portion 22 can move along the nailing line toward Z, and move downward from a first position 23 before nailing to a second position 24 after nailing, and then move upward from the second position 24 for resetting to the first position 23.

The rotary actuator 10 is essentially a motor that can output a specific rotation angle, including a stator 11, a rotor 12 and even groups of electro-magnetic mutual action components 13, 14. The stator 11 is made in the form of a solid cylinder and has an outer surface of equal circumference. The two ends of the stator 11 is formed with a positioning column 11a, so that the stator 11 can be fixed through the positioning column 11a inside the body of the rotary actuator 10 and will not move. The rotor 12 is made in the form of a ring, and is pivoted outside the stator 11, capable of spinning freely and concentrically. The even groups of electro-magnetic mutual action components 13, 14 are in the form of two pairs, and are distributed between the outer surface of the stator 11 and the inner surface of the rotor 12 at intervals.

Further referring to FIG. 1, FIG. 2, FIG. 2a to FIG. 2d and FIG. 3, which disclose a preferred embodiment of the even groups of electro-magnetic mutual action components 13, 14. As illustrated, the even groups of electro-magnetic mutual action components configured between the stator 11 and the rotor 12 are essentially four groups: A, B, C, and D, and each group of electro-magnetic mutual action components respectively has a wire cluster and a magnetic plate configured in a pair. Group A and C electro-magnetic mutual action components respectively have a first wire cluster 13a and a first magnetic plate 13b configured in a pair, and Group B and D electro-magnetic mutual action components respectively have a second wire cluster 14a and a second magnetic plate 14b, forming 4 wire clusters and 4 magnetic plates configured in pairs.

Figure 2:
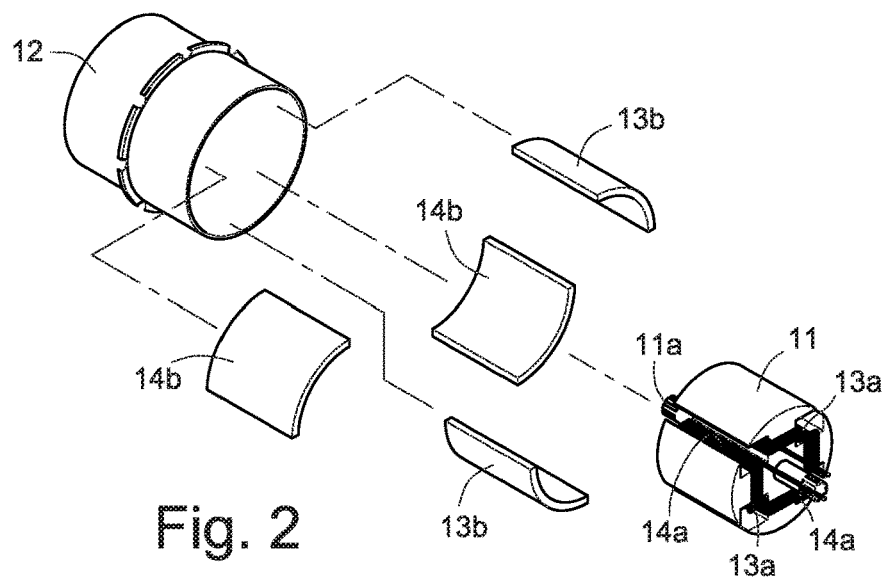
FIG. 2 is an exploded perspective view of FIG. 1 showing the configuration of electro-magnetic mutual action components between the stator and the rotor.
Figure 2A:
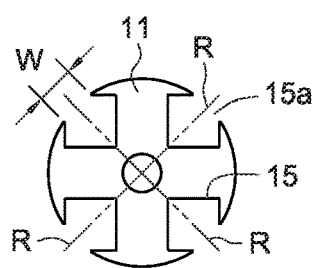
FIG. 2a is a diagrammatic view of the structure of the stator in FIG. 2.

Specifically, the stator 11 can be divided by concentric angles of 90 degrees into 4 normal lines R extending outward, and the outer wall of the stator 11 can be configured with a wire collecting slot 15 along each of the four normal lines R, so that the four wire collecting slots 15 are distributed on the periphery of the stator 11 with equal circumference. Each wire collecting slot 15 has an open slot opening 15a formed in the direction of the normal line R of the stator 11, and each open slot opening 15a respectively has a slot opening width W (as shown in FIG. 2a). The first magnetic plate 13b and second magnetic plate 14b are both made in the form of an arc-shaped plate, and are fixed on the inner wall of the rotor 12 (see FIG. 2c, FIG. 2d and FIG. 3) in a way that they can respectively induce mutual action with the current generated by the first wire cluster 13a and the second wire cluster 14a in the direction of the normal line.

Figure 2B:
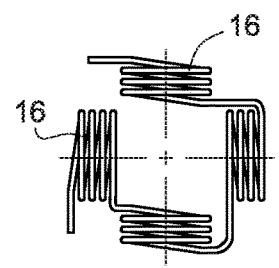
FIG. 2b is a diagrammatic view of the structure of the coil in FIG. 2.

Specifically, as shown in FIG. 2b, in the present embodiment, the coil 16 is made in four bundles, formed by winding a single wire in serial connection. The wire can be an enameled wire, and the first wire cluster 13a in Group A and C electro-magnetic mutual action components and the second wire cluster 14a in Group B and D electro-magnetic mutual action components disclosed in FIG. 2 are both formed by one part of the two coils 16 disclosed in FIG. 2b; In other words, a coil 16 can be implanted from the slot opening 15a into the two neighboring wire collecting slots 15 shown in FIG. 2a for winding, so that each wire collecting slot 15 houses part of the wires of two bundles of coils 16 at the same time, thus forming the wire cluster inside each of the wire collecting slots (as shown in FIG. 1 and FIG. 2).

Figure 2C:
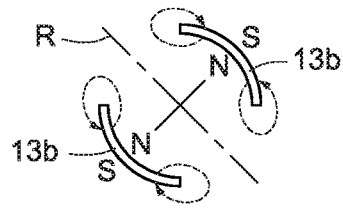
FIG. 2c is a diagrammatic view of the first magnetic plate of the electro-magnetic mutual action components in Group A and C in FIG. 2.

Specifically, as shown in FIG. 2c, the two first magnetic plates 13b are configured in a matching form along their respective normal line R, with their inner surfaces as the N-pole, and their outer surfaces as the S-pole, providing the first wire cluster 13a with magnetic lines dispersing outward (indicated by the dotted lines in FIG. 2c). That is to say, the magnetic lines of the two first magnetic plate 13b are dispersing from the inner surface toward the outer surface.

Figure 2D:
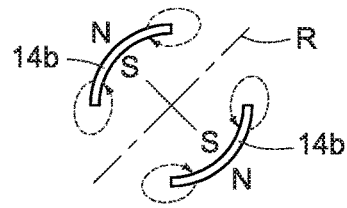
FIG. 2d is a diagrammatic view of the first magnetic plate of the electro-magnetic mutual action components in Group B and D in FIG. 2.

Further, as shown in FIG. 2d, the two second magnetic plates 14b are not only matching each other along their respective normal lines R, they are configured corresponding to the two first magnetic plates 13b shown in FIG. 2c with a separating space, and the two second magnetic plates 14b are configured with their outer surface as the N-pole, and their inner surface as the S-pole, so as to provide the above-said second wire cluster 14a with magnetic lines (indicated by dotted lines in FIG. 2d) that disperse from outside toward inside. That is to say, the magnetic lines of the second magnetic plate 14b disperse from the outer surface toward the inner surface. Based on such a structure, the neighboring first magnetic plate 13b and second magnetic plate 14b respectively generate magnetic lines in opposite polarities (see FIG. 3).

Figure 3:
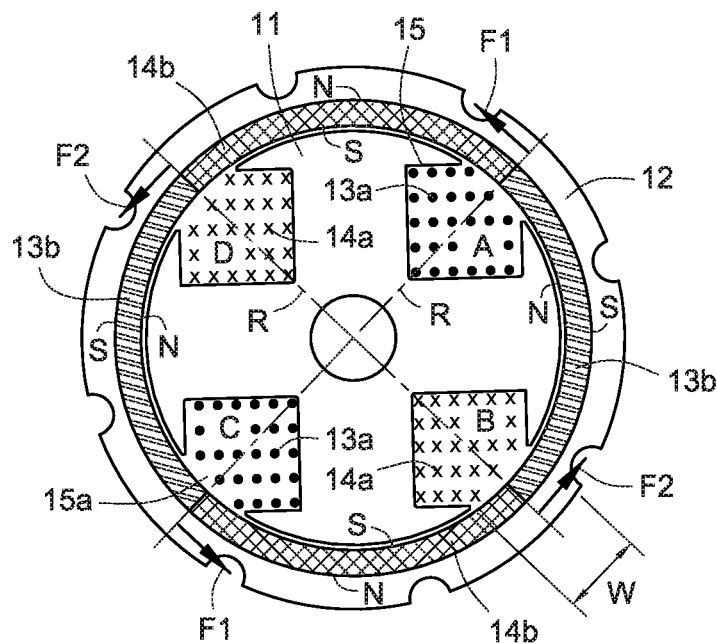
FIG. 3 is a diagrammatic view of the configuration in FIG. 1 showing the electro-magnetic mutual action components driving the rotor to rotate.

Referring to FIG. 3, which illustrates the directions of the electrical current, both of the matching first wire clusters 13a in Group A and C electro-magnetic mutual action components shown in FIG. 2 along their respective normal lines R can transmit electrical currents in the same direction from the inside of the paper toward the outside of the paper (In FIG. 3, the current direction is indicated by "."); Both of the matching second wire cluster 14a in Group B and D electro-magnetic mutual action components along their respective normal lines R can transmit electrical currents in the same direction from the outside of the paper toward the inside of the paper (In FIG. 3, the current direction is indicated by "x"). Thus, the two neighboring first wire cluster 13a and second wire cluster 14a generate electrical currents in different directions. Based on this configuration, the first wire cluster 13a in Group A electro-magnetic mutual action components can generate an electrical current in the "." direction, correspondingly, its first magnetic plates 13b configured in a pair can generate magnetic lines that disperse from the inner surface N-pole toward the outer surface S-pole. According to Ampere right-hand rule, the Group A electro-magnetic mutual action components can generate a tangential force F1 to cause anti-clockwise rotation, to drive the rotor 12 to rotate anti-clockwise; Furthermore, the second wire cluster 14a in Group B electro-magnetic mutual action components can generate an electrical current in the "x" direction, and correspondingly, its second magnetic plates 14b configured in a pair can generate magnetic lines that disperse from the outer surface N-pole toward the inner surface S-pole. According to Ampere right-hand rule, Group B electro-magnetic mutual action components can also generate a tangential force F2 to cause anti-clockwise rotation. In particular, the tangential forces F1, F2 are equal and can both generate rotations in the same anti-clockwise direction, so that they can simultaneously drive the rotor 12 to rotate anti-clockwise for the specific rotation angle.

Figure 3F:
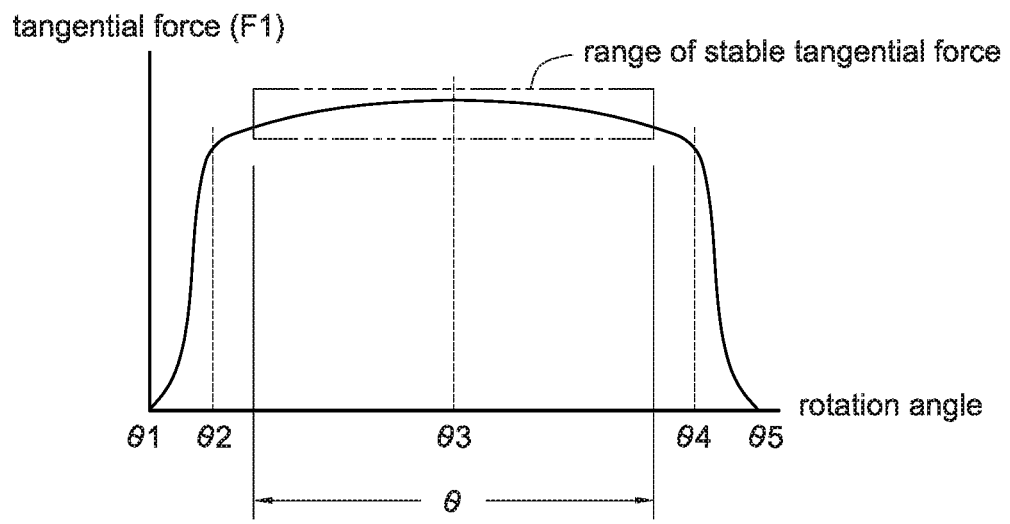
FIG. 3f discloses the curve of the tangential force induced on the magnetic plate during the process of rotation in FIG. 3a to FIG. 3e.
Figure 3A:
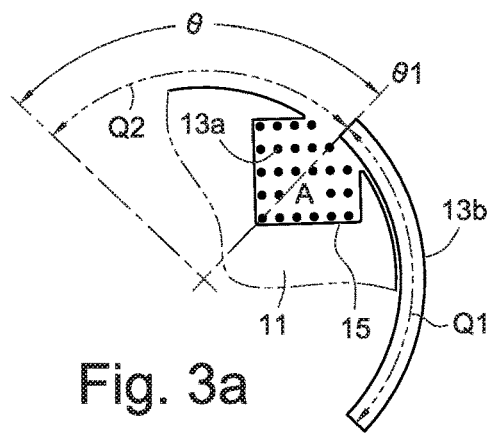
FIG. 3a to FIG. 3e sequentially illustrate the angle positions in FIG. 3 when the magnetic plate generates a specific rotation angle.
Figure 3B:
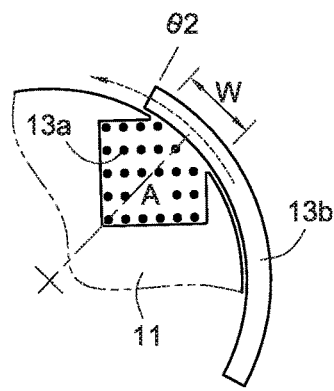
Figure 3C:
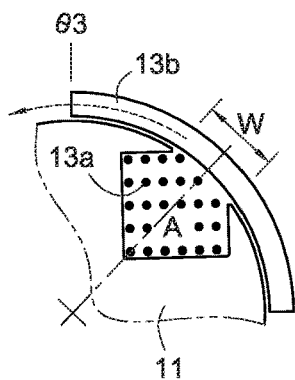
Figure 3D:
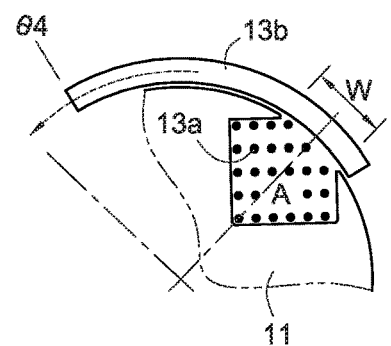
Figure 3E:
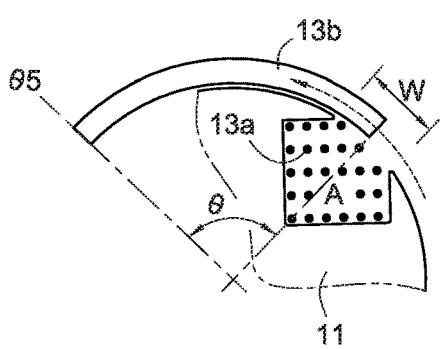

Referring to FIG. 3a, take the first wire cluster 13a and first magnetic plate 13b in Group A electro-magnetic mutual action components for example, the first wire cluster 13a wound inside the wire collecting slot 15 can release, through the slot opening width W of the slot opening 15a, effective magnetic field outward along the normal line R (i.e., toward the first magnetic plate 13b). Furthermore, the first magnetic plate 13b has a magnetic plate arc length for dissipating magnetic lines Q1. The aforesaid specific rotation angle θ itself has a specific rotational angle arc length Q2; the specific rotation angle θ can be determined by the slot opening width W and the magnetic plate arc length Q1; More specifically, in the embodiment shown in FIG. 1 to FIG. 3f, when converting to linear distances, the following definition can be made: "the magnetic plate arc length Q1≥specific rotational angle arc length Q2>slot opening width W>0". In other words, based on FIG. 3a, a further definition can be made: "the magnetic plate arc length Q1≥(specific rotational angle arc length Q2+slot opening width W)". Based on this implementation, as the example in FIG. 3a, the effective magnetic field provided by a small slot opening width W can induce mutual action with magnetic lines dispersed by the first magnetic plate 13b of a large magnetic plate arc length Q1, and drive the first magnetic plate 13b to generate the required specific rotation angle θ. The specific rotational angle arc length Q2 refers to the length within the range of the specific rotation angle θ of the magnetic plate's central arc line rotates; the slot opening width W is the width of the normal projection of the slot opening on the central arc line of the magnetic plate, and the comparison is made by converting them to linear distances.

Further, the present invention is not limited by the above. The coil 16 can cause the stator 11 to have magnetic induction when it is electrified, the size of the slot opening width W will not limit the range of the effective magnetic field, nor will it affect the specific rotation angles θ generated by the magnetic plate. Therefore, when the "specific rotational angle arc length Q2>magnetic plate arc length Q1>slot opening width W>0", so that "the specific rotational angle arc length Q2>(slot opening width W+magnetic plate arc length Q1)", it is also a feasible embodiment. Based on Ampere right-hand rule, using the magnetic lines dispersed by the magnetic plate arc length Q1 relatively less than the specific rotational angle arc length Q2, the relatively smaller slot opening width W and stator 11 can also be induced to generate an effective magnetic field, so as to drive the first magnetic plate 13b to generate the required specific rotation angle. Therefore, the magnetic plate arc length Q1 in the direction of the normal line R of the stator 11 can be larger than or less than the specific rotation angle arc length Q2. Both of them fall within the technical scope of the present invention and can be implemented.

Referring to FIG. 3a to FIG. 3e, the variation of the rotation angle generated by the first magnetic plate 13b of the present invention after being actuated induced by the magnetic field generated by the first wire cluster 13a are illustrated one by one. In particular, in FIG. 3a, the first magnetic plate 13b is positioned at the first angle position θ1 before rotation. And then, in FIG. 3b to FIG. 3e, the first magnetic plate 13b is actuated induced by the magnetic field generated by the first wire cluster 13a and rotates to a second angle position θ2 (see FIG. 3b), a third angle position θ3 (see FIG. 3c), a fourth angle position θ4 (see FIG. 3d) and a fifth angle position θ5 (see FIG. 3e); In particular, the first angle position θ1 (see FIG. 3a) is the starting point of the rotation angle, whereas the fifth angle position θ5 (see FIG. 3e) is the end point of the rotation angle.

Referring to FIG. 3f, from FIG. 3a to FIG. 3e, when the first magnetic plate 13b rotates from the first angle position. θ1 with zero tangential force to the second angle position θ2, the tangential force F1 will rise suddenly to drive the rotor 12 to rotate rapidly. Then, when the first magnetic plate 13b rotates from the second angle position θ2 to the third angle position θ3, the tangential force F1 reaches the maximum. Then, when the first magnetic plate 13b rotates from the third angle position θ3 to the fourth angle position θ4, the tangential force F1 is slightly reduced. When rotating from the fourth angle position θ4 to the fifth angle position θ5, the tangential force F1 decreases rapidly to zero. Based on this, it is known that, when the first magnetic plate 13b rotates from the second angle position θ2 to the fourth angle position θ4, the first magnetic plate 13b can output a stable tangential force F1. Based on this, the present invention can use the rotation angle corresponding to the "range of stable tangential force" shown in FIG. 3f as the specific rotation angle θ, so as to enhance the speed and rate of good nailing when the nailing rod 20 moves downward for a nailing stroke L (see FIG. 4).

Figure 4:
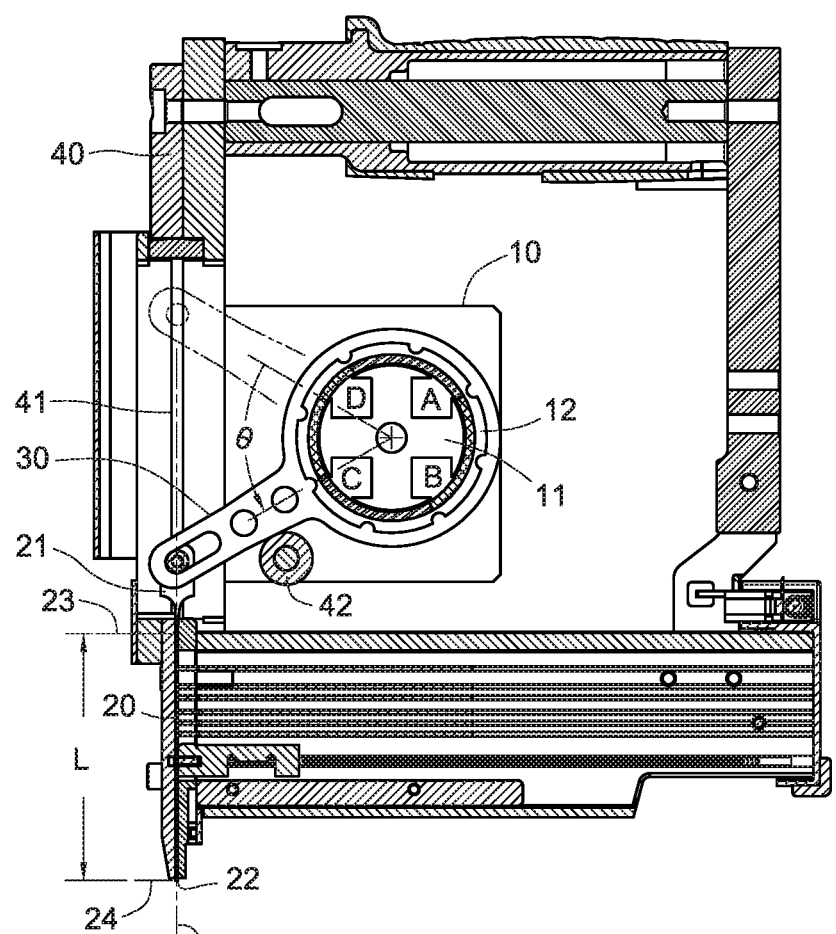
FIG. 4 is a sectional view of the nail drive device in FIG. 1 when it drives the nailing rod to move downward for nailing.

Based on the above, referring to FIG. 1 and FIG. 4 together, both the first magnetic plate 13b and the second magnetic plate 14b can be driven to rotate anti-clockwise for a specific rotation angle θ. Therefore, in FIG. 1, the rotor 12 for fixing the first magnetic plate 13b and the second magnetic plate 14b can also be driven to rotate anti-clockwise for a specific rotation angle θ (see FIG. 4). Moreover, as shown in FIG. 1, the rotor 12 is formed with a power output end 30, so that the rotor 12 can be connected through the power output end 30 to the driving portion 21 of the nailing rod 20; when the rotor 12 is driven to rotate for the specific rotation angle θ, it will drive, through the power output end 30 and the driving portion 21, the nailing rod 20 to move along the nailing line toward Z for a nailing stroke L. Thus, the present invention can, according to the requirement for the nailing stroke L, plan the specific rotation angle θ, and the corresponding stator 11, rotor 12, and even groups of electro-magnetic mutual action components 13 to have the above features and specifications.

Further referring to FIG. 1, in implementation, the above power output end 30 can be a swing arm 31. To be more specific, the two ends of the swing arm 31 is formed with a ring part 31a and a pivoting part 31b; the swing arm 31 can be fixed through the ring part 31a on the ring-shaped outer wall of the rotor 12; the pivoting part 31b is configured with a stroke hole, and correspondingly, the driving portion 21 of the nailing rod 20 is formed with a pivoting hole, so that a pivoting shaft 25 can be fitted between the pivoting part 31b of the swing arm 31 and the driving portion 21 of the nailing rod 20 for pivot connection. Thus, when the swing arm 31 is driven by the rotor 12 to generate a specific rotation angle θ, it can convert the rotational kinetic energy to a linear kinetic energy for the nailing rod 20 to move downward for nailing.

Figure 5:
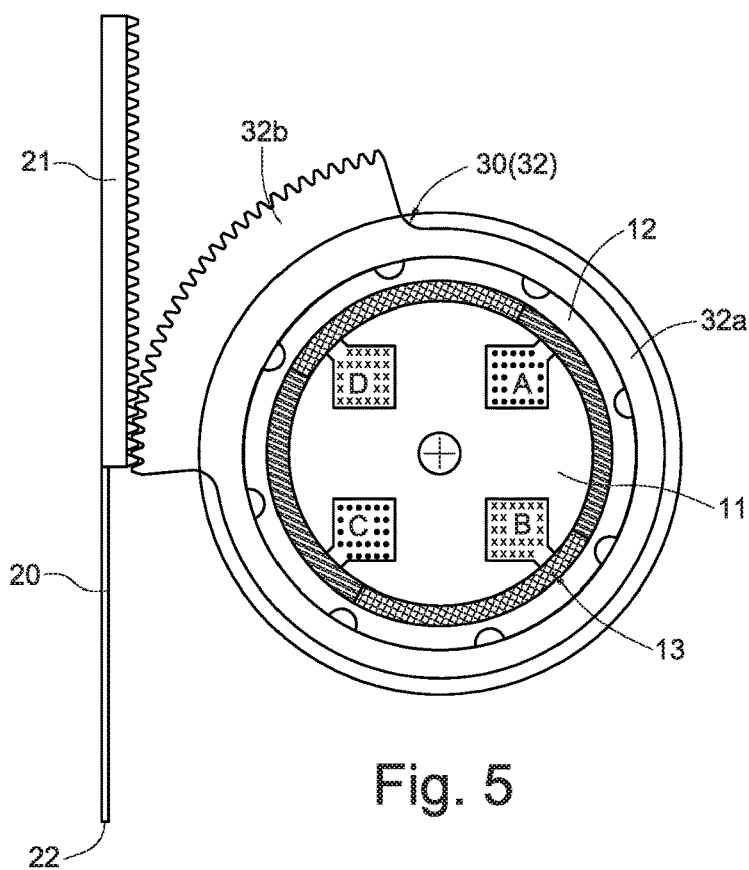
FIG. 5 is a configuration view of another embodiment of the nail drive device according to the present invention.

Referring to FIG. 5, in implementation, the power output end 30 can be a gear sector 32. More specifically, the two ends of the gear sector 32 can be respectively formed with a ring part 32a and a gear part 32b, and correspondingly, the driving portion 21 of the nailing rod 20 is made in the form of a gear rack; the gear sector 32 can be fixed through the ring part 32a on the ring-shaped outer wall of the rotor 12, and the gear part 32b of the gear sector 32 can mesh with the gear rack (driving portion 21) of the nailing rod 20. Thus, when the gear sector 32 is driven by the rotor 12 to generate a specific rotation angle θ, through the mesh between the gear part 32b and the gear rack (i.e., the 0driving portion 21 of the nailing rod 20), it can convert the rotational kinetic energy into a linear kinetic energy for the nailing rod 20 to move downward for nailing.

Figure 6:
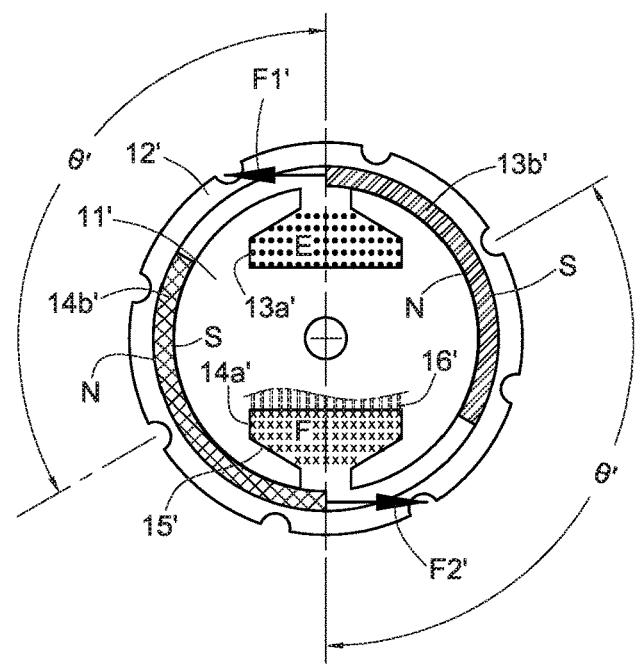
FIG. 6 is a sectional view of another preferred embodiment of the electro-magnetic mutual action component according to the present invention.

Then, referring to FIG. 6, which discloses another embodiment of the even groups of electro-magnetic mutual action components, it differs from the embodiment disclosed in FIG. 1 to FIG. 4 in that:

There are two wire collecting slots 15' in the present embodiment, formed on the outer wall of the stator 11', opposite each other at an angle of 180 degrees and adjacent each other. The even groups of electro-magnetic mutual action components are two groups in the present embodiment, indicated by Group E and F. In particular, Group E electro-magnetic mutual action components has a first wire cluster 13a' and a first magnetic plate 13b' configured in a pair, Group F electro-magnetic mutual action components has a second wire cluster 14a' and a second magnetic plate 14b' (see FIG. 6) configured in a pair.

The coil 16' is one bundle in the present embodiment, made by winding one single wire between the two wire collecting slots 15' of the stator 11', forming first wire cluster 13a' of Group E electro-magnetic mutual action components and second wire cluster 14a' of Group F electro-magnetic mutual action components; In particular, the first wire cluster 13a' can transmit an electrical current in the direction from the inside of the paper toward the outside of the paper (in FIG. 6, the direction of the electrical current is indicated by "."). The second wire cluster 14a' can transmit an electrical current in the direction from the outside of the paper toward the inside of the paper (in FIG. 6, the direction of the electrical current is indicated by "x").

There are two magnetic plates in the present embodiment, i.e., a first magnetic plate 13b' and a second magnetic plate 14b'; In particular, the first magnetic plate 13b' has the following configuration of polarity: N-pole on the inner surface, and S-pole on the outer surface, to provide the first wire cluster 13a' with magnetic lines dispersing from the inside (N-pole) toward the outside (S-pole); the second magnetic plate 14b' has the following configuration of polarity: N-pole on the outer surface, and S-pole on the inner surface, to provide the second wire cluster 14a' with magnetic lines dispersing from the outside (N-pole) toward the inside (S-pole). Thus, the first magnetic plate 13b' and the second magnetic plate 14b' opposite and neighboring each other can generate magnetic lines in opposite polarities.

Based on the above configurations and Ampere right-hand rule, Group E electro-magnetic mutual action components can generate a tangential force F1' to cause anti-clockwise rotation, whereas Group F electro-magnetic mutual action components can also generate a tangential force F2' to cause anti-clockwise rotation, and F1'=F2' to simultaneously drive the rotor 12' to rotate for a specific rotation angle θ' in the anti-clockwise direction.

Based on this, the embodiment shown in FIG. 6 can also use the definitions and descriptions of the embodiment shown in FIG. 1 to FIG. 4 for the slot opening width W, the magnetic plate arc length Q1 and the specific rotational angle arc length Q2. And the embodiment shown in FIG. 6 can also use the descriptions of the embodiment shown in FIG. 1 and FIG. 5 for the different implementations of the power output end 30. Thus, when the rotor 12' generates a specific rotation angle θ' in the anti-clockwise direction, through the above power output end 30, it can convert the rotational kinetic energy to a linear kinetic energy for the nailing rod 20 to move downward for nailing.

Based on the above, the driving technology of the present invention for the nailing rod 20 to move downward for nailing can be implemented. Moreover, the present invention also includes the following three types of nailing rod 20 to move upward for resetting, to be selected for different applications:

The first style: In the above embodiment of the present invention, whether there are four bundles or just one bundle of coil 16, 16', without changing the above feature of configuration of the rotary actuator 10, the two ends of the single wire of the wound coil 16, 16' can be used to apply timed (i.e., in different time sections) reversal of the positive and negative power source; To be more specific, the positive-to-negative forward current before reversing can be used for the rotary actuator 10 to output the aforesaid anti-clockwise rotation to drive the nailing rod 20 to move downward for nailing; and the negative-to-positive backward current after reversing can be used for the rotor to have clockwise rotation to drive the nailing rod 20 to move upward for resetting. In FIG. 3 and FIG. 6, the direction of the electrical current in each wire cluster is indicated by ".". When it is reversed to "x" (i.e., the positive and negative pole power source on the two ends of the wire are reversed), without changing the N and S poles of the magnetic plate, the rotor 12, 12' can be driven to rotate clockwise for the specific rotation angle θ, θ', so as to drive the nailing rod 20 to move along the nailing line toward Z to move upward for resetting.

The second style: Based on the coil winding method described in the above embodiment, coils 16, 16' can be wound in the wire collecting slots 15, 15' of each stator to act specially as the nailing coil, and the first wire clusters 13a, 13a' and the second wire clusters 14a, 14a' act as special nailing wire clusters; In addition, in the wire collecting slot 15, 15' of the same stator 11, 11', another wire can be used, using the same serial connection and winding method, another group of resetting coils (like the coils shown in FIG. 2b) can be configured. The resetting coils can be wound inside the wire collecting slots 15, 15' to act as a resetting wire cluster (not shown in the figure), specially for the backward current to drive the nailing rod 20 to move upward for resetting. Thus, a reversed negative-to-positive backward current can be transmitted inside the resetting wire cluster to drive the nailing rod 20 to move along the nailing line toward Z and move upward for resetting.

Figure 7:
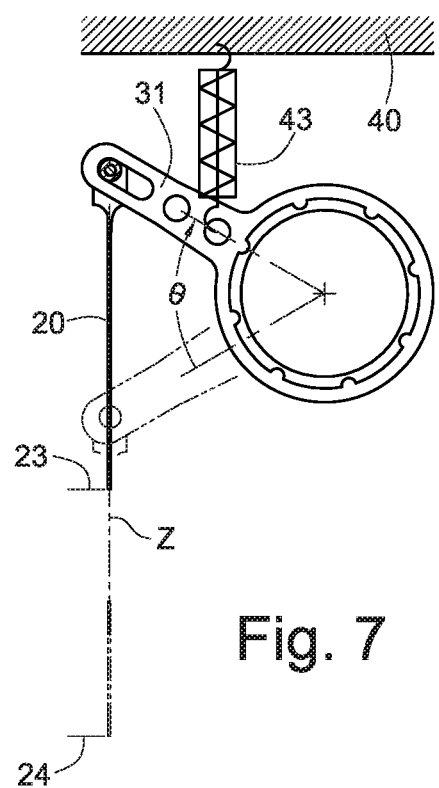
FIG. 7 is a configuration view of an embodiment of the present invention driving the nailing rod to move upward for resetting.

The third style: In the implementation from FIG. 1 to FIG. 4, an additional elastic device 43 (see FIG. 7) can be configured between the swing arm 31 and the body 40 as the fixing end. The elastic device 43 can be a draw spring, a pressure spring, a torque spring or any other elastic object. Specifically, when the nailing rod 20 moves downward for nailing, the elastic device 43 can accumulate an elastic force, to drive the nailing rod 20 to move along the nailing line toward Z and move from the second position 24 upward for resetting to the first position 23, and close the specific rotation angle θ.

In addition, in the above implementation, the inside of the body 40 can be fixed with a stopper 42 (see FIG. 1), to assist the limitation of the swing angle of the rotor 12. To be more specific, whether the power output end 30 is implemented as a swing arm 31 or a gear sector 32, at the end of the nailing stroke of the nailing rod 20, the stopper 42 can be configured on the bottom of the end point after the power output end 30 swings anti-clockwise for a specific rotation angle, to limit the power output end 30 from rotating further. Thus, it can assist the limitation of the rotor 12, 12' to enhance the durability and safety.

Although the invention has been explained in relation to its preferred embodiment, it is to be understood that many other possible modifications and variations can be made without departing from the spirit and scope of the invention as hereinafter claimed.

The invention claimed is:

1. A nail drive device of electric nail gun, configured inside the body of a nailing machine, comprising:
   a nailing rod, slidably configured inside the body along a nailing line, and one end of the nailing rod is formed with a driving portion;
   a rotary actuator, includes a rotor concentrically configured around a stator, between the stator and the rotor, even groups of electro-magnetic mutual action components are configured in pairs, each group of the electro-magnetic mutual action components includes a wire cluster that can generate effective magnetic fields of the same electrical current direction, and a magnetic plate that provides effective magnetic fields to generate magnetic lines to induce mutual action with the wire cluster;

specifically, the stator is fixed inside the rotary actuator, the rotor is formed with a power output end, the power output end is connected to the driving portion of the nailing rod;

the directions of electrical currents generated in the two neighboring wire clusters are opposite to each other, and the configuration of the two neighboring magnetic plates can generate magnetic lines of different polarities, so that the two neighboring electro-magnetic mutual action components can work together to generate a tangential force in the same rotational direction, to drive the rotor to rotate for a specific rotation angle, and then through the power output end and the driving portion, to drive the nailing rod to move downward along the nailing line for a nailing stroke; and the wire cluster in each group of the electro-magnetic mutual action components has a slot opening width for generating an effective magnetic field, and the magnetic plate in each group of the electro-magnetic mutual action components has a magnetic plate arc length for dissipating magnetic lines, the specific rotation angle is defined by the slot opening width and the magnetic plate arc length, the nailing stroke is determined by the specific rotation angle.

2. The nail drive device of electric nail gun defined in claim 1, wherein said power output end is a swing arm, the two ends of the swing aim are respectively formed with a ring part and a pivoting part, the swing arm is fixed through the ring part on the outer wall of the rotor, the swing arm is connected through the pivoting part to the driving portion of the nailing rod.

3. The nail drive device of electric nail gun defined in claim 1, wherein said power output end is a gear sector, the driving portion of the nailing rod is formed into a gear rack, the two ends of the gear sector are respectively formed with a ring part and a gear sector part, the gear sector is fixed through the ring part on the outer wall of the rotor, and the gear sector mesh with the gear rack through the gear sector part.

4. The nail drive device of electric nail gun defined in claim 1, which further includes an elastic device connected between the body and the power output end, the elastic device generates an elastic force when the nailing rod has moved for a nailing stroke, the elastic force drives the nailing rod to move along the nailing line for resetting.

5. The nail drive device of electric nail gun defined in claim 1, which further includes an elastic device connected between the body and the nailing rod, the elastic device generates an elastic force when the nailing rod has moved for a nailing stroke, the elastic force drives the nailing rod to move along the nailing line for resetting.

6. The nail drive device of electric nail gun defined in claim 1, wherein the even number of wire clusters are respectively configured at intervals on the outer wall of the stator along a normal line of the stator, the direction of the electrical current is perpendicular to the direction of the normal line.

7. The nail drive device of electric nail gun defined in claim 6, wherein the periphery of the stator is configured with an even number of wire collecting slots for housing the wire clusters, and two neighboring wire collecting slot provide space for the winding of at least one coil to form the wire clusters in each of the wire collecting slots.

8. The nail drive device of electric nail gun defined in claim 6, wherein, the even number of magnetic plates are fixed on the inner wall of the rotor in a way to induce mutual action with the electrical current generated by the wire cluster in the direction of each normal line.

9. The nail drive device of electric nail gun defined in claim 6, wherein the magnetic plate arc length in the direction of the normal line of the stator is larger than the specific rotation angle arc length.

10. The nail drive device of electric nail gun defined in claim 6, wherein the magnetic plate arc length in the direction of the normal line of the stator is less than the specific rotation angle arc length.

11. The nail drive device of electric nail gun defined in claim 7, wherein each wire collecting slot has an open slot opening formed in the direction of the normal line of the stator, the slot opening width is defined by the open slot opening.

12. The nail drive device of electric nail gun defined in claim 7, wherein said coil is formed by winding a wire in serial connection, the two ends of the wire are connected to a forward current and a backward current in different times, the forward current is used to drive the nailing rod for nailing, whereas the backward current is used to drive the nailing rod for resetting.

13. The nail drive device of electric nail gun defined in claim 7, wherein each wire cluster includes a nailing wire cluster and a resetting wire cluster, the coil includes at least one nailing coil and at least one resetting coil, and two neighboring wire collecting slots provide room to the nailing coil and resetting coil to be wound together, to form the nailing wire cluster and resetting wire cluster in each wire collecting slot, the nailing coil is formed by winding a nailing wire in serial connection, whereas the resetting coil is formed by winding a resetting wire in serial connection, the two ends of the nailing wire can be connected to a forward current to drive the nailing rod for nailing, whereas the two ends of the resetting wire can be connected to a backward current to drive the nailing rod for resetting.

14. The nail drive device of electric nail gun defined in claim 1, wherein, a stopper is fixed inside the body to limit the swing angle of the rotor.

\* \* \* \* \*